UNITED STATES PATENT OFFICE

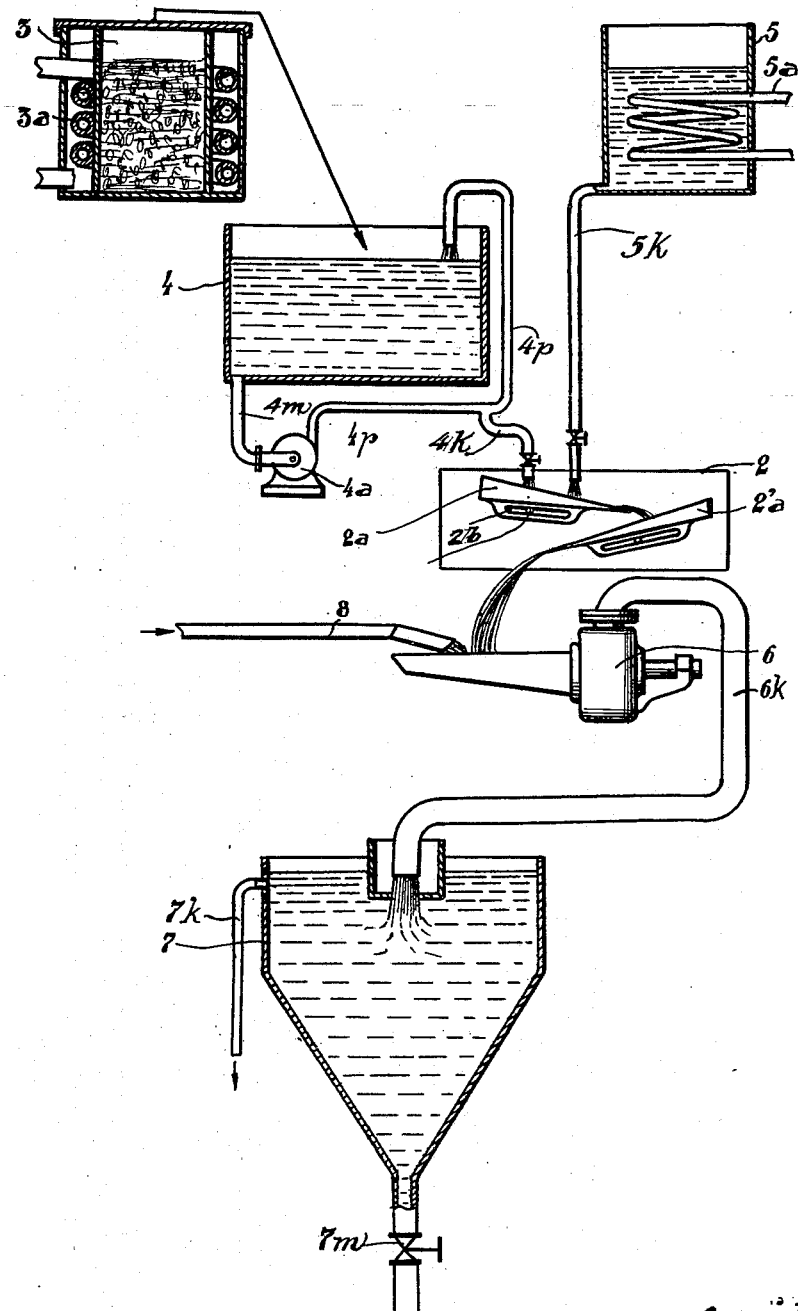

RENÉ AUGUSTE HENRY, OF BRUSSELS, BELGIUM

PROCESS AND DEVICE FOR THE PREPARATION OF SOLS AND THEIR USE FOR CONCENTRATING MATERIALS SUSPENDED IN LIQUID TO BE CLARIFIED

Application filed August 15, 1928, Serial No. 299,862, and in Belgium June 9, 1928.

I have invented a new and efficient method of preparing coagulating sols as well as a method for the clarification of water containing solid particles in suspension or liquid particles in emulsion in a way to produce rapid flocculation. For this purpose, I make use of amylaceous substances and basic reagents.

It is known that if amylaceous substances are submitted to the action of certain basic reagents and if the reaction is allowed to run to conclusion, a gel results from the total destruction of the amylaceous substances by the basic reagent. The gel obtained is not apt to create flocculation in the midst of a liquid. The gel particles are not visible by the microscope, but may be examined by the ultra microscope.

I have discovered that if the action on amylaceous substances by the basic reagent is stopped before these substances are entirely destroyed, a sol is produced by this partial action which has very intense coagulative properties and which can create rapid flocculation of particles in emulsion or in suspension in a liquid; generally, the sol particles are visible through the microscope.

I have also found that preliminary thermic treatment of the amylaceous materials (by heat or cold, according to circumstances) permits the rapidity of clarification to be increased to a great degree.

To clarify the invention, I define as follows the expression "basic solution" used hereinafter: A basic solution is a liquid the pH of which is higher than 7; 7 being the ionization constant of water according to Ostwald (Michaelis, Clark, Sorensen).

An embodiment of the invention is illustrated by way of example and in a non-limiting manner in the accompanying drawing.

A frame indicated in dotted lines and designated by the numeral 2 encloses certain devices into which are led, a basic solution entering through a duct $5k$ provided with a regulating cock from a tank 5 the temperature of which is regulated by means of a coil $5a$, and an aqueous suspension of amylaceous materials, which suspension is intended to form a sol by being placed in the presence of the named basic solution.

According to the invention, the amylaceous materials are subjected to a suitable temperature obtained by a coil $3a$ traversed by a fluid, for a suitable length of time in a vessel 3 provided with a removable cover.

In various circumstances this thermic treatment is effected by subjecting these materials to the action of cold for about 48 hours, for example. The object of this treatment is to regulate the sensitiveness of the amylaceous materials to attack by the basic salt.

These amylaceous materials are then placed in a tank 4 in which their suspension in water is maintained by a pump $4a$ the suction duct $4m$ of which leads into the said tank 4 into which also flows the liquid delivered through the delivery duct $4p$.

Upon the delivery duct $4p$ is also connected an exhaust duct $4k$ provided with a regulating cock leading the suspension into the devices enclosed by the frame 2.

The devices bring the suspension led through the duct $4k$ into contact with the basic solution led through the duct $5k$ by their common flow through a channel comprising two elements $2a$ and $2'a$ respectively.

With a view to obtaining a contact between the suspension of amylaceous material and the basic solution for a period of time which can be regulated, the speed of the flow and the length of the path traveled in this channel are adjustable. The speed of flow in each of the elements $2a$ and $2'a$ is adjustable by varying the inclination of these elements, for example by varying their angular position relatively to an axis such as $2p$. The length of the path traveled in each of the elements is adjustable by varying their relative position, for example by making them slide by means of a slot such as $2b$ relatively to an axis such as $2p$.

This regulation of the duration of contact permits the reaction to be carried to a suitable stage. The invention provides in the case of the treatment of amylaceous materials by a basic solution, for this suitable stage to be of such for example, that the transformation of the amylaceous materials into particles which are still optically visible with an ordinary microscope, will not be continued as far as the destruction of the said particles and their transformation into total or partial gel.

In the installation shown in the figure, these particles are in fact employed in order to produce by their flocculation, the concentration of materials in suspension in a liquid to be clarified, led in through a duct 8.

The invention further provides for the reaction between the suspension of amylaceous materials and the chemical agent to be stopped by dilution in a supplementary quantity of added liquid.

In the arrangement shown, this supplementary addition is formed by the liquid to be clarified which is led through the duct 8 and contains for example mud, slime, etc., which it is desired to concentrate.

The mixture, stirring or kneading of the sol and the liquid to be clarified is effected in a centrifugal pump 6 with a partially submerged inlet so that it draws in not only the liquid and materials carried along, but also air.

The delivery duct 6k of this pump leads the liquid containing the materials coagulated by flocculation, into a decanter 7 to the bottom of which they fall.

The mud thus formed may be removed through a valve 7m while the clarified liquid flows away through a duct 7k.

There is hereinafter given, by way of example, the conditions under which it is possible to effect an instantaneous (several seconds) coagulation of matter in suspension in water to be clarified.

In order to clarify 280 m³, per hour, of water containing about 25 g. of impurities per liter (carbon, schists, clay, organic matter) with the addition of 0.26 grams of CaO per liter, there is used (1) a basic solution containing about 15.9 kg. of caustic soda per 1000 m³ of water to be clarified, (2) a suspension of starch in water containing about 6.5 kg. of potato starch per 1000 m³ of water to be clarified; this potato starch preliminarily kept in a refrigerator (for example, for 24 hours) at a temperature of about $-5°$ C. The basic solution and water containing the potato starch are mixed for about 2 seconds after which the mixture thus obtained is itself quickly mixed with the water to be clarified; the coagulation of the particles of undissolved matter which remain suspended within the water is almost instantaneous and the clarification is rapid.

It is to be understood that the above process and apparatus is merely a preferred embodiment of the invention and that various modifications are contemplated which would come within the spirit and scope of the following claims.

I claim:—

1. A process for the preparation of coagulating sols in which an amylaceous substance is placed in the presence of a basic salt comprising regulating the temperature of a basic solution so as to maintain the temperature thereof at a point slightly above the freezing point thereof, regulating the temperature of said amylaceous substance in suspension so as to maintain the temperature thereof lower than the freezing temperature of said basic solution, then bringing said basic solution into contact with said amylaceous substance and then terminating the reaction between them.

2. A process for the preparation of coagulating sols in which an amylaceous substance is placed in the presence of a basic salt comprising regulating the temperature of a basic solution so as to maintain the temperature thereof at a point slightly above the freezing point thereof, regulating the temperature of said amylaceous substance in suspension so as to maintain the temperature thereof lower than the freezing temperature of said basic solution, then bringing said basic solution into contact with said amylaceous substance and then abruptly terminating the reaction between them.

3. A process for the preparation of coagulating sols in which an amylaceous substance is placed in the presence of a basic salt comprising regulating the temperature of a basic solution so as to maintain the temperature thereof at a point slightly above the freezing point thereof, regulating the temperature of said amylaceous substance in suspension so as to maintain the temperature thereof lower than the freezing temperature of said basic solution, then bringing said basic solution into contact with said amylaceous substance and then terminating the reaction between them while maintaining said basic solution at a temperature slightly higher than said freezing point.

4. A process for the preparation of coagulating sols in which an amylaceous substance is placed in the presence of a basic salt comprising regulating the temperature of a basic solution so as to maintain the temperature thereof at a point slightly above the freezing point thereof, regulating the temperature of said amylaceous substance in suspension so as to maintain the temperature thereof lower than the freezing temperature of said basic solution, maintaining said substance in a state of suspension by working said substance in a closed circuit, then bringing said basic solution into contact with said amylaceous substance and then terminating the reaction between them.

5. A process for the preparation of coagulating sols in which an amylaceous substance is placed in the presence of a basic salt comprising regulating the temperature of a basic solution so as to maintain the temperature thereof at a point slightly above the freezing point thereof, regulating the temperature of said amylaceous substance in suspension so as to maintain the temperature thereof lower than the freezing temperature of said basic solution, then bringing said basic solution into contact with said amylaceous substance, and then terminating the reaction by a dilution of the sol formed.

6. A process for the preparation of coagulating sols in which an amylaceous substance is placed in the presence of a basic salt comprising regulating the temperature of a basic solution so as to maintain the temperature thereof at a point slightly above the freezing point thereof, regulating the temperature of said amylaceous substance in suspension so as to maintain the temperature thereof lower than the freezing temperature of said basic solution, then bringing said basic solution into contact with said amylaceous substance and then terminating the reaction by a dilution of the sol formed.

7. A process for the preparation of caogulating sols in which an amylaceous substance is placed in the presence of a basic salt comprising regulating the temperature of a basic solution so as to maintain the temperature thereof at a point slightly above the freezing point thereof, regulating the temperature of said amylaceous substance in suspension so as to maintain the temperature thereof lower than the freezing temperature of said basic solution, then bringing said basic solution into contact with said amylaceous substance, then regulating the duration of contact and then terminating the reaction by diluting the sol formed during said contact.

8. A process for the preparation of coagulating sols in which an amylaceous substance is placed in the presence of a basic salt comprising regulating the temperature of a basic solution so as to maintain the temperature thereof at a point slightly above the freezing point thereof, regulating the temperature of said amylaceous substance in suspension so as to maintain the temperature thereof lower than the freezing temperature of said basic solution, then bringing said basic solution into a series of contacts with said amylaceous substance, then regulating the duration of said series of contacts and then diluting the sol formed during said contacts.

9. A process for the preparation of coagulating sols in which an amylaceous substance is placed in the presence of a basic salt comprising regulating the temperature of a basic solution so as to maintain the temperature thereof at a point slightly above the freezing point thereof, regulating the temperature of said amylaceous substance in suspension so as to maintain the temperature thereof lower than the freezing temperature of said basic solution, then bringing said basic solution into contact with said amylaceous substance, and then terminating the reaction by a dilution of the sol formed, said dilution being caused by adding to the mixture containing the sol formed an additional quantity of liquid containing substances in suspension whereby the sol formed will attach to said substances to clarify said diluting liquid.

10. A process for the preparation of coagulating sols in which an amylaceous substance is placed in the presence of a basic salt comprising regulating the temperature of a basic solution so as to maintain the temperature thereof at a point slightly above the freezing point thereof, regulating the temperature of said amylaceous substance in suspension so as to maintain the temperature thereof lower than the freezing temperature of said basic solution, then bringing said basic solution into contact with said amylaceous substance, and then terminating the reaction by a dilution of the sol formed, said dilution being caused by adding to the mixture containing the sol formed an additional quantity of liquid containing substances in suspension and then agitating said resulting mixture so as to secure a homogeneous dilution of said sol and said diluting liquid.

11. A process for the preparation of coagulating sols in which an amylaceous substance is placed in the presence of a basic salt comprising regulating the temperature of a basic solution so as to maintain the temperature thereof at a point above the freezing point thereof, regulating the temperature of said amylaceous substance in suspension so as to maintain the temperature thereof lower than the freezing temperature of said basic solution, then bringing said basic solution into contact with said amylaceous substance and then terminating the reaction between them.

12. A process for the preparation of coagulating sol comprising subjecting amylaceous materials to the attack by a basic reagent and suddenly stopping the reaction before the total destruction of the amylaceous materials by the basic reagent.

13. A process for the preparation of coagulating sol comprising subjecting amylaceous materials to the attack by a basic reagent and rapidly expanding in liquid the products thus formed before the total destruction of the amylaceous materials by the basic reagent.

14. A process for the preparation of coagulating sol comprising subjecting amylaceous materials to a previous thermic treatment, subjecting said materials to the attack by a basic reagent and suddenly stopping the reaction before the total destruction of the amylaceous materials by the basic reagent.

15. A process for the clarification of liquid comprising subjecting amylaceous materials to the attack by a basic reagent, suddenly stopping the reaction before the total destruction of the amylaceous materials by the basic reagent, and then mixing the sol thus formed with the liquid to be clarified.

16. A process for the clarification of liquid comprising subjecting amylaceous materials to the attack by a basic reagent, and then stopping the reaction before the total destruction of the amylaceous materials by expanding the coagulating sol thus formed in the liquid to be clarified.

17. A process for the clarification of liquid comprising subjecting amylaceous materials to a previous thermic treatment, subjecting said materials to the attack by a basic reagent, suddenly stopping the reaction before the total destruction of the amylaceous materials by the basic reagent, and then mixing the sol thus formed with the liquid to be clarified.

18. A process for the clarification of liquid comprising mixing a suspension of amylaceous materials with a basic solution, adding the mixture in the liquid to be clarified before the total destruction of the amylaceous materials by the basic solution, and agitating the resulting mixture so as to secure a homogeneous dilution in said liquid.

19. A device for the preparation of coagulating sol comprising a channel, means for leading at one end of said channel a flow of liquid having amylaceous materials in suspension and a flow of a basic solution, means for rapidly diluting at the other end of the channel the mixture of both flows, and adjustable means for regulating the length of time of travel of the common flow in said channel.

20. In a device for the clarification of liquid comprising means for subjecting a suspension of amylaceous materials to an attack by a basic solution during a predetermined time and a centrifugal pump receiving at the end of this time the mixture obtained and a flow of liquid to be clarified, means for regulating the common flow of the liquid to be clarified and the mixture so that the inlet of said pump is partially submerged by the common flow so that the pump draws simultaneously the common flow and air for energetically mixing the same.

In testimony whereof I affix my signature.

RENÉ AUGUSTE HENRY.